United States Patent Office 3,595,909
Patented July 27, 1971

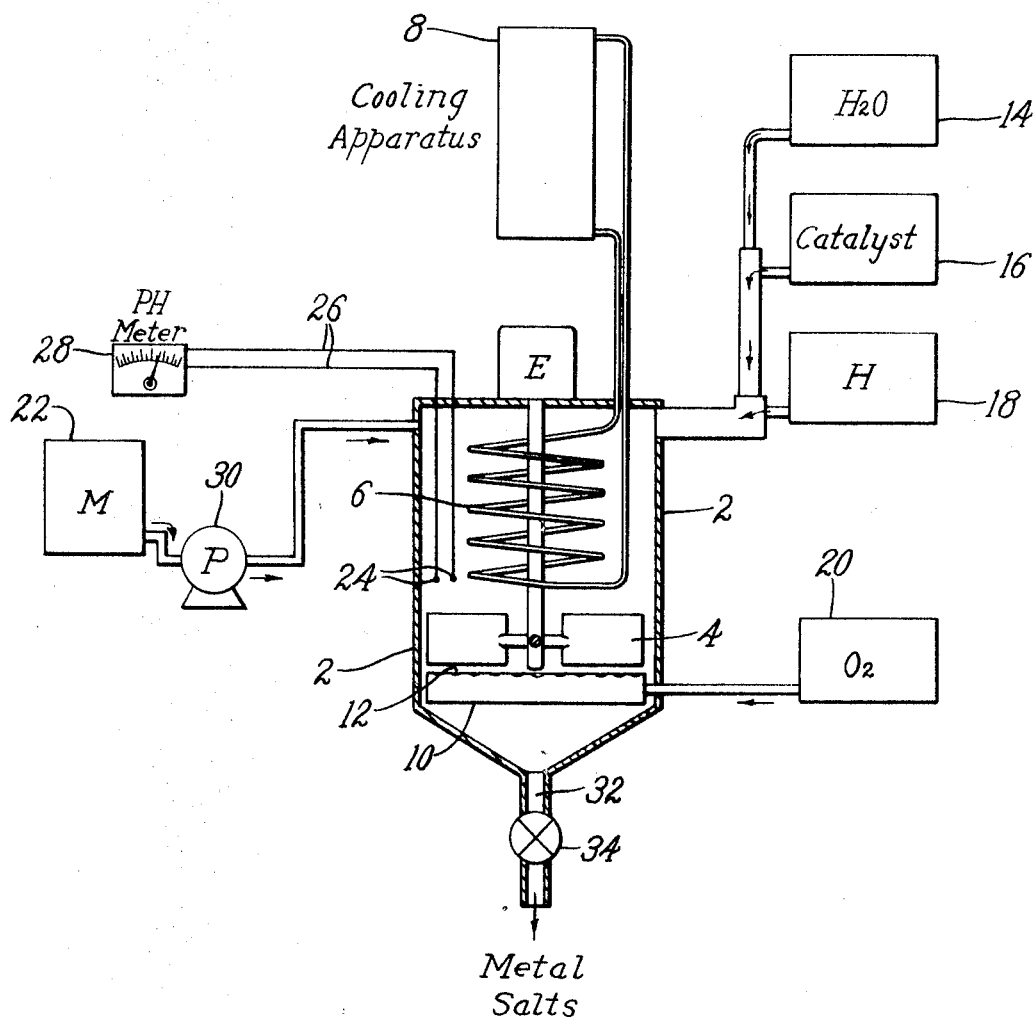

3,595,909
PROCESS FOR MAKING ACID METAL SALTS
FROM ORGANIC HYDROXYL COMPOUNDS
Robert C. Sheldon, Marshfield, Mass., assignor to Middleboro Chemical Industries, Inc., Middleboro, Mass.
Filed Nov. 1, 1967, Ser. No. 679,745
Int. Cl. C07c 51/30
U.S. Cl. 260—528                                    1 Claim

ABSTRACT OF THE DISCLOSURE

A process for making acid metal salts from organic hydroxyl compounds comprising mixing water and a catalyst comprising palladium on inert support material in a reactor, agitating the mixture to produce a uniform catalyst suspension, admixing with the catalyst suspension the hydroxyl compound to be converted, injecting oxygen into the mixture, and admitting a metal hydroxide to the reactor, to convert substantially all of the hydroxyl compound to its corresponding organic acid metal salt.

BACKGROUND OF THE INVENTION

Field of the invention

The invention relates generally to a method for making organic acid metal salts from hydroxyl compounds and is directed more particularly to such a method in which the end product yield is extremely high and the production of by-products is virtually non-existent.

Description of the prior art

The conversion of organic hydroxyl compounds to acid metal salts has in the past been encumbered by requirements for heavy equipment suitable for operation under high pressures and temperatures for extended periods of time.

As an example, the conversion of ethanol to sodium acetate has been accomplished by adding oxygen and a catalyst, such as manganese acetate, to an aqueous solution of ethanol, the mixture reacting to produce first acetaldehyde which further oxidizes to acetic acid in accordance with the following formula:

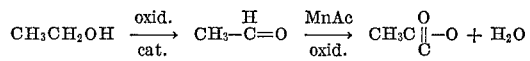

The above operation is carried out at an elevated pressure and temperature. It should be further noted that the above reaction is conducive to the formation of explosive peroxides. The acetic acid is then, in a separate and subsequent operation, mixed with sodium hydroxide to produce sodium acetate:

The process, as described above, has proved to be about 60–70% efficient, i.e., the weight of the desired final product is only about 60–70% of the theoretically possible final product weight, based upon the weight of the ethanol converted. In addition, the high pressures and temperatures under which the process is carried out necessitate the use of massive equipment and are deleterious from not only an economic, but also a safety standpoint.

SUMMARY OF THE INVENTION

It is an object of the present invention to provide a process for converting organic hydroxyl compounds, such as monohydroxyl aliphatics, monohydroxyl aromatics, monohydroxyl cyclics, dihydroxyls, trihydroxyls, polyhydroxyls, unsaturated alcohols, etc., to their corresponding acid metal salts, which process produces the final product at close to 100% of the possible final product weight.

Another object of the invention is to provide such a process which can be carried out at substantially atmospheric pressures and at relatively low temperatures, thereby eliminating the necessity of expensive high pressure and high temperature equipment and reducing substantially the hazards to safety.

A still further object of the invention is to provide such a process in which all the steps of the process can be carried out in one continuous operation as opposed to the two separate operations formerly required.

With the above and other objects in view, as will hereinafter appear, the present invention in one aspect thereof contemplates as its principal feature a method for making acid metal salts from hydroxyl compounds comprising admitting water and a catalyst comprising palladium on inert support material to a reactor and commencing agitation of the mixture to produce a uniform catalyst suspension, admixing with the suspension the hydroxyl to be converted, introducing oxygen into the mixture while continuing the mechanical agitation of the mixture, maintaining the mixture at a temperature of from 15° C. to 60° C., and admitting an aqueous solution of a metal hydroxide, which acts as a buffering agent to maintain the mixture in a pH range of from 7.5 to 9.0, and as a reactant to produce an acid metal salt in aqueous form and at a yield of about 87–100% of that theoretically possible, there being substantially no by-products or waste material, and the process being carried out at substantially atmospheric pressures.

BRIEF DESCRIPTION OF THE DRAWING

The drawing is a schematic presentation of the apparatus used in practicing the present unique process.

DESCRIPTION OF THE PREFERRED EMBODIMENTS

Referring to the drawing, it may be seen that the reactor utilized in the process of this invention includes a shell 2 having mechanical agitation means, such as rotatable blades 4, disposed therein. The blades 4 may be rotated by a power means, such as an electric motor E. Cooling means, such as cooling coils 6 are located in the shell 2 to maintain the contents of the shell at a desired temperature. Cooling apparatus 8 is provided and may include automatic controls (not shown) so that the interior of the shell can be maintained in the desired temperature range with a minimum of operator attention.

Disposed in the lower portion of the shell 2 and located proximate to the agitator blades 4 is a sparge ring 10 which is annularly shaped and has a plurality of perforations 12 on its upper surface for the passage of air or other oxygen-containing bubbles therethrough into the shell. Storage means for water 14, catalyst 16, hydroxyl compound 18, air or oxygen-containing gas 20, and metal hydroxide 22 are in communication with the shell 2, the air storage means 20 being connected directly to the sparge ring 10.

A pair of electrodes 24 are located inside the shell 2 and are connected by leads 26 to a pH meter 28 which operates, responsive to the pH reading in the shell, to start or stop a pump 30 which forces metal hydroxide from the storage means 22 to the shell 2. The shell is provided with an outlet 32 having a valve 34 which may be opened to permit withdrawal of the end product from the shell.

In practicing the process of the present invention, the reactor 2 is charged with a predetermined quantity of water from the water storage means 14. To the water in the reactor is added a catalyst material from the catalyst storage means 16. The catalyst material comprises 5% palladium on inert support material, such as carbon, and is of a weight equal to 2.5–10% of the weight of the hydroxyl to be converted. As used herein, it is intended that the terms "catalyst material" refer to the combination of catalyst and its inert support material. The motor E is then energized to cause rotation of the blades 4 to agitate the water-catalyst slurry and thereby to produce a uniform catalyst suspension. Alternatively, the water and catalyst may be introduced into the shell 2 simultaneously, as will be further discussed below.

To the aqueous catalyst suspension is added a quantity of the hydroxyl to be converted. The quantity of hydroxyl admixed with the catalyst suspension is dependent upon the yield desired. The mixture concentration is predetermined by known methods to yield a 15–40% by weight aqueous reaction product.

Oxidation of the mixture is accomplished by admitting air or oxygen from the storage means 20 to the sparge ring 10 under pressure. The pressure should be such as to insure injection of air at a rate of .3–1.5 liter per gallon of mixture per minute. The air enters the agitated mixture by way of the holes 12 in the sparge ring 10. In most cases air is preferable to pure oxygen because of the fire hazard present in some operations, particularly in the oxidation of short carbon chain alcohols.

While admitting air to the reactor, and thereafter, the temperature control means (not shown) operates, through the cooling coils 6, to maintain the temperature of the mixture at about 15° C.–60° C. The rotating blades 4, in addition to thoroughly mixing the contents of the shell, act to further divide the fine bubbles emitted from the sparge ring 10.

It is desirable that oxidation occur in a mildly alkaline solution in a pH range of 7.5–9.0. The pH level is maintained in the desired range by the cooperative operation of the pH meter 28 and the pump 30 to introduce an aqueous solution of a metal hydroxide to the reactor from the metal hydroxide storage area 22. Alternatively, the metal hydroxide may be under pressure, as by gravity, and the pH meter 28 operate to open and close a valve which permits metal hydroxide to transfer from the storage area 22 to the reactor shell 2.

The reactor is generally provided with a vent line (not shown) which may permit the escape of some of the hydroxyl, particularly if the temperature of the mixture is permitted to exceed the optimum limit. In such case, "blowing" of vaporized hydroxyl material out of the reaction mixture occurs. This is a more prevalent problem in the lower carbon chain alcohols which have a low boiling point. However, by incorporating a condenser in the reactor vent line, losses of this nature can be eliminated or at least minimized.

The conversion is complete in about 10–46 hours, depending upon operating conditions. The weight of the end product is generally 87–100% of the theoretically possible end product weight, representing a substantial increase over prior art processes.

After a cycle of operation has been completed, the mixture is filtered for removal of the catalyst which may be used again for the next cycle. In practice, the filter (not shown) may retain the catalyst and the next quantity of water admitted to the reactor may be flowed through the filter to carry the catalyst back into the reactor. Thus, the catalyst storage area 18 may comprise a catalyst filter and the water and catalyst may be admitted to the reactor simultaneously.

EXAMPLE I

Into the above described reactor, 26.50 pounds of water and .44 pound of 5% palladium on carbon catalyst were charged and the agitator started. To the agitated mixture there was added 8.75 pounds of ethanol. Air was then forced through the sparge ring and into the mixture at the rate of 1.00 liter per gallon of mixture per minute. The temperature of the mixture was automatically controlled at 28° C. Over an elapsed time of 28 hours, 4.34 liters of 50% aqueous sodium hydroxide were admitted to the mixture to maintain the mixture in a pH range of 8.3–8.8 and to react with the mixture. The catalyst was removed by filtration and the end product comprised 50 pounds of 30% aqueous sodium acetate which represented a 100% ethanol conversion.

EXAMPLE II

Into the reactor 26.70 pounds of water and .43 pound 5% palladium on carbon catalyst were charged and the agitator started. To the agitated mixture there was added 8.70 pounds of n-propanol. Air was then forced through the sparge ring and into the mixture at the rate of .42 liter per gallon of mixture per minute. The temperature of the mixture was automatically controlled at 30° C. Over an elapsed time of 37 hours, 3.45 liters of 50% aqueous sodium hydroxide were admitted to the mixture to maintain the mixture in a pH range of 8.0–8.8. The catalyst was removed by filtration and the end product comprised 47 pounds of 30% aqueous sodium propionate which represented a 100% n-propanol conversion.

EXAMPLE III

Into the reactor 26.00 pounds of water and .68 pound of 5% palladium on carbon catalyst were charged and the agitator started. To the agitated mixture there was added 14.90 pounds of dextrose monohydrate. Air was then forced through the sparge ring and into the mixture at the rate of .42 liter per gallon of mixture per minute. The temperature of the mixture was automatically controlled at 35° C. Over an elapsed time of 17 hours, 1.77 liters of 5% aqueous sodium hydroxide were admitted to the mixture to maintain the mixture in a pH range of 8.0–8.5. The catalyst was removed by filtration and the end product comprised 47 pounds of 35% aqueous sodium gluconate which represented a 91.4% dextrose conversion.

EXAMPLE IV

Into the reactor 23.80 pounds of water and .33 pound of 5% palladium on carbon catalyst were charged and the agitator started. To the agitated mixture there was added 6.60 pounds of methanol. Air was then forced through the sparge ring and into the mixture at the rate of .42 liter per gallon of mixture per minute. The temperature of the mixture was automatically controlled at 28° C. Over an elapsed time of 46 hours 4.20 liters of 50% aqueous sodium hydroxide were admitted to the mixture to maintain the mixture in a pH range of 7.5 to 8.5. The catalyst was removed by filtration and the end product comprised 47.5 pounds of 25.8% aqueous sodium formate which represented an 87.5% methanol conversion.

EXAMPLE V

Into the reactor 27.90 pounds of water and .48 pound of 5% palladium on carbon catalyst were charged and the agitator started. To the agitated mixture there was added 9.50 pounds of n-butanol. Air was then forced through the sparge ring and into the mixture at the rate of .52 liter per gallon of mixture per minute. The temperature of the mixture was automatically controlled at 32° C. Over an elapsed time of 36 hours 3.07 liters of 50% aqueous sodium hydroxide were admitted to the mixture to maintain the mixture in a pH range of 8.0–8.5. The catalyst was removed by filtration and the end product comprised 48 pounds of 29% aqueous sodium butyrate which represented a 100% butanol conversion.

In each example above described the process was carried out at substantially atmospheric pressure.

Although in each example the catalyst comprised 5% palladium on carbon, it is believed that a range of 3–7% palladium on any suitable inert support material would be suitable. However, as a practical matter, 5% palladium on carbon is readily available on the open market and is therefore presently the most economical palladium on inert support catalyst.

The foregoing, particularly in the examples, is illustrative of the invention and not intended as a limitation thereof. Many variations may be made in the products and processes set forth above without departing from the spirit and scope of this invention.

Having thus described my invention, what I claim as new and desire to secure by Letters Patent of the United States is:

1. A process for making sodium acid salts from organic hydroxyl compounds selected from the group consisting of methanol, ethanol, propanol, butanol, and dextrose monohydrate, said process consisting of the steps of admixing water, a catalyst and said hydroxyl compound, said catalyst consisting essentially of an inert support material having 3 to 7% palladium therein, said catalyst being present in amounts from 2.5 to 10% by weight of the hydroxyl compound, introducing bubbles comprising oxygen into the mixture while maintaining the temperature of said mixture at 15° to 60° C. and while maintaining the pH of said mixture in a range between 7.5 to 9.0 by adding sodium hydroxide thereto.

References Cited
UNITED STATES PATENTS

| | | | |
|---|---|---|---|
| 3,449,413 | 6/1969 | Hartel et al. | 260—531 |
| 3,342,858 | 9/1967 | Fuhrmann et al. | 260—531 |
| 3,192,258 | 6/1965 | Nakagana et al. | 260—531 |

JAMES A. PATTEN, Primary Examiner

R. D. KELLY, Assistant Examiner

U.S. Cl. X.R.

23—285, 288E; 260—531C